UNITED STATES PATENT OFFICE.

HENRI RAYMOND VIDAL, OF PARIS, FRANCE.

BROWN-BLACK SULFUR DYE.

SPECIFICATION forming part of Letters Patent No. 608,355, dated August 2, 1898.

Application filed December 28, 1897. Serial No. 664,08 (No specimens.) Patented in France March 11, 1897, No. 264,900, and in England March 16, 1897, No. 6,913.

*To all whom it may concern:*

Be it known that I, HENRI RAYMOND VIDAL, of Paris, France, have invented a new and useful Improvement in Coloring-Matters, which improvement is fully set forth in the following specification, and for which I have obtained a patent in France, No. 264,900, dated March 11, 1897, and in Great Britain, No. 6,913, dated March 16, 1897.

This invention relates to the production of coloring-matters by the general method described in my application, Serial No. 645,862, filed July 24, 1897, and embraces, specifically, the production of coloring-matters by the action of sulfur on the condensation products of sulfanilic acid (para or meta) and orthoamidophenol or its isomer, metaämidophenol, or its analogue of the naphthalene series— *i. e.*, amidonaphthol—one to four.

Example: Heat in oil-bath in an iron vessel to from 170° to 200° centigrade or thereabout twenty-eight kilograms of a coloring-matter derived from parasulfanilic acid and orthoamidophenol. Then throw into the liquefied mass sulfur (six kilos) and maintain the temperature at 170° to 200° centigrade until the agitator stops. Then form a sodic solution of the mass, which after desiccation is a coloring-matter dyeing unmordanted cotton black brown. Instead of forming the sodic salt after sulfuration it can be made before. The product is soluble in alkalies and insoluble in acid.

In the preceding reaction I may substitute for the orthoamidophenol its isomer, the metaämidophenol, or its analogue of the naphthalene series—*i. e.*, amidonaphthol—one to four.

Instead of employing the parasulfanilic acid in the two preceding reactions I may replace it by the isomer, the metasulfanilic acid, or by its analogue of the naphthalene series, the naphthionic acid.

All these coloring-matters dye unmordanted cotton in brown black.

If in the preceding reactions I replace the condensation products of the amidophenols or amidonaphthols and the amidobenzene sulfonic acids (meta or para) or naphthionic acid by the condensation products of these same acids and of the paraphenylenediamin or naphthalenediamin, one to four, I obtain coloring-matters similar to the preceding, dyeing unmordanted cotton brown black. In the latter case it is unnecessary to add soda, inasmuch as with the diamins no sodic salts could be formed.

Having thus described my invention, what I claim as new, and desire to secure by Letters Patent, is—

1. The process of obtaining coloring-matters, consisting in heating with sulfur a condensation product of the amidobenzene sulfonic acids with a derivative of phenol or a diamin, such as the condensation product of the parasulfanilic acid and orthoamidophenol, substantially as described.

2. The specified coloring-matters being sulfonated condensation products of sulfanilic acid and a specified amidophenol (as orthoamidophenol) being a dark mass, soluble in alkalies, insoluble in acid and having the property of directly dyeing unmordanted cotton a brown black, substantially as described.

In testimony whereof I have signed this specification in the presence of two subscribing witnesses.

HENRI RAYMOND VIDAL.

Witnesses:
EDWARD P. MACLEAN,
ANTOINE ROUSSANNES.